Oct. 20, 1942.   J. L. GIFFEN ET AL   2,299,621
CLUTCH OPERATING MECHANISM
Filed June 23, 1939   2 Sheets-Sheet 1
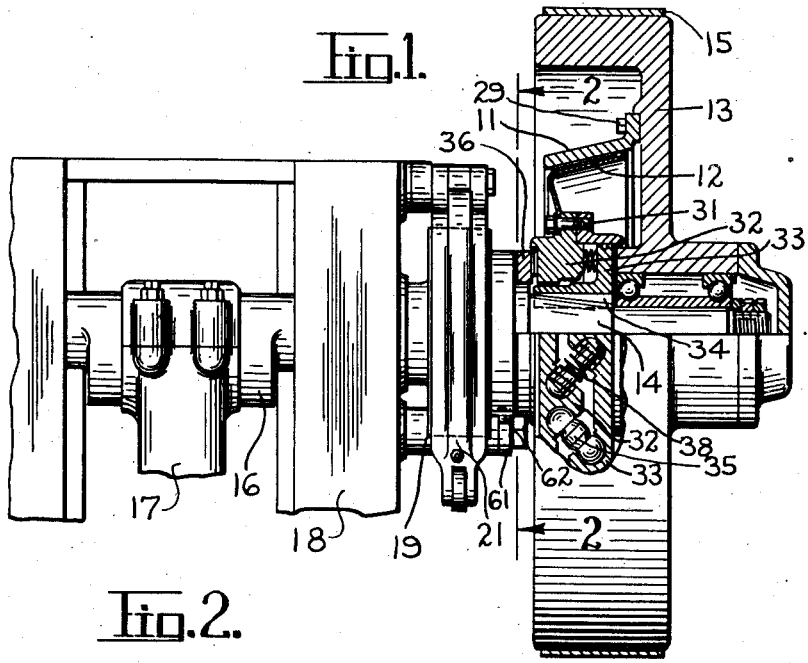
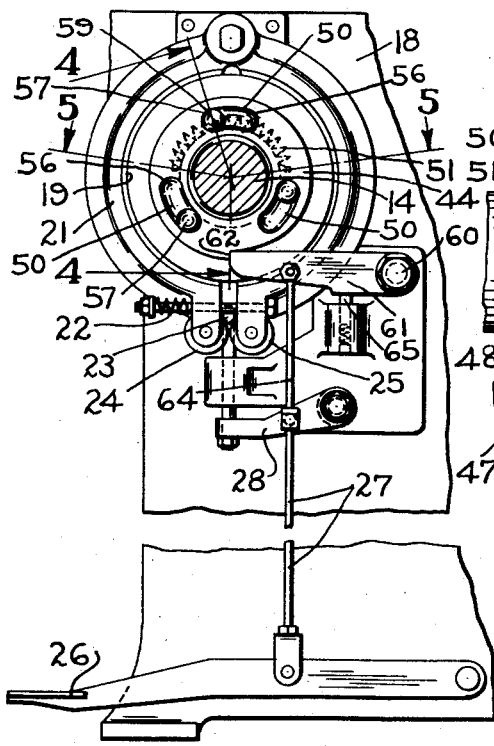
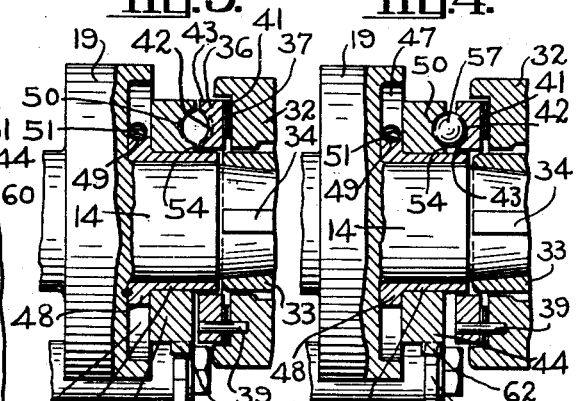
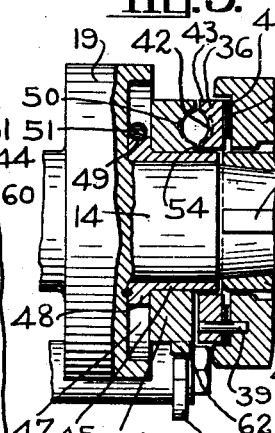
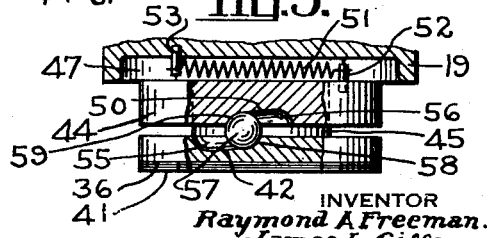
INVENTOR
*Raymond A Freeman.*
*James L. Giffen.*
BY
*Walter S. Edwards*
ATTORNEY Oct. 20, 1942.                J. L. GIFFEN ET AL                  2,299,621
                         CLUTCH OPERATING MECHANISM
                          Filed June 23, 1939           2 Sheets-Sheet 2
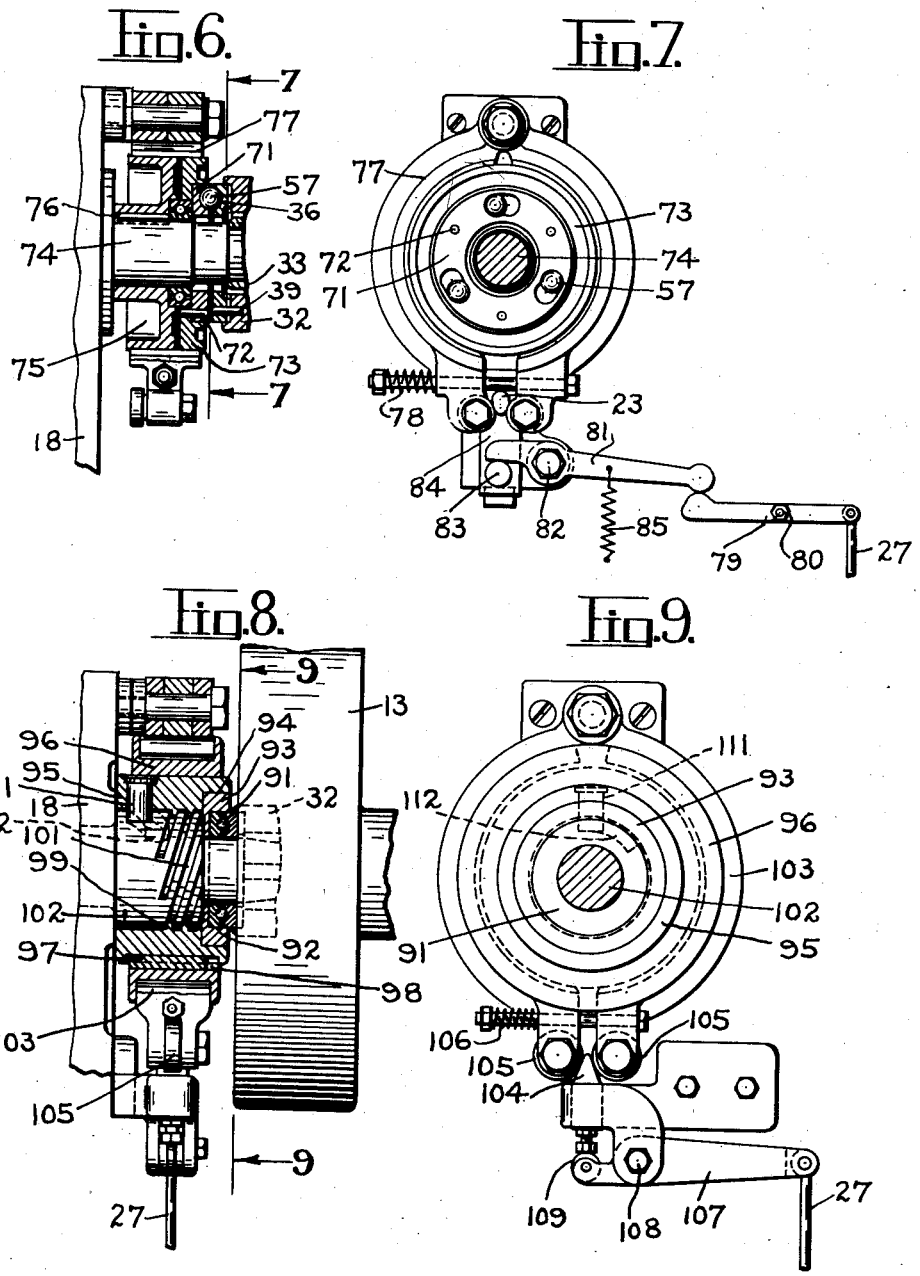
INVENTOR
Raymond A. Freeman.
James L. Giffen.
BY
Walter S. Edwards.
ATTORNEY Patented Oct. 20, 1942

2,299,621

UNITED STATES PATENT OFFICE 2,299,621

CLUTCH OPERATING MECHANISM

James L. Giffen and Raymond A. Freeman, Hudson, N. Y., assignors to V & O Press Company, Inc., Hudson, N. Y., a corporation of New York Application June 23, 1939, Serial No. 280,700

9 Claims. (Cl. 192—24)

This invention relates to improvements in clutch operating mechanism and more particularly to a mechanism for operating clutches of the types wherein one clutch part is required to move axially in respect to the other clutch part to engage and disengage them.

This invention contemplates, as one of its objects, the provision of an operating mechanism for axially actuating clutches and which utilizes the rotative movement of a driven shaft as its operating medium.

Another object is to provide an improved form of operating mechanism for a clutch, arranged to rotatably connect a driven member to a driving means, and which is adapted to be actuated by the rotative movement of the driven member.

Still another object is to provide an improved form of operating mechanism for an axially operable clutch which includes a pair of members arranged to be rotated when the clutch parts are in engaged position and wherein means is provided to restrain the rotation of one of the members to cause other included means to axially separate these members to impose a relative axial movement between the clutch parts to disengage them.

A further object is to provide in a clutch operating mechanism of the above nature means to automatically reset the operable parts of said mechanism in position to permit engagement of the clutch parts when the restraining means is released.

A still further object of this invention is to provide an improved clutch operating mechanism which will be relatively inexpensive to manufacture, simple in construction, compact, readily assembled and installed and very efficient and durable in use.

With these and other objects in view, which will appear as the description proceeds, there has been illustrated in the accompanying drawings, several forms in which the invention may be conveniently embodied in practice.

In the drawings, wherein like reference numerals designate like parts throughout the several views;

Figure 1 is a broken front view of a punch press, and a clutch mechanism partly in section, in operative relation with a clutch operating mechanism embodying the features and principles of this invention;

Figure 2 is a broken side sectional view of the press indicated in Figure 1 taken on line 2—2 of Figure 1;

Figures 3 and 4 are broken sectional views of the clutch operating mechanism of this invention in two operative positions, the section being taken on line 4—4 of Figure 2;

Figure 5 is a broken sectional view taken on line 5—5 of Figure 2;

Figure 6 is a broken vertical sectional view through a clutch operating mechanism of somewhat modified form;

Figure 7 is a side view of the parts shown and looking in the direction of arrows 7—7 of Figure 6;

Figure 8 is a broken vertical sectional view through a clutch operating mechanism of another modified form; and Figure 9 is a side view of the parts shown and looking in the direction of arrows 9—9 in Figure 8.

Referring now to the drawings and more particularly to Figures 1 and 2, the clutch operating mechanism of this invention is shown disposed in operative relation with respect to a clutch generally comprising a pair of cone-shaped parts 11 and 12 arranged to be engaged and disengaged by relative axial movement to drivingly connect a flywheel 13, herein constituting the driving means, with a shaft 14, herein constituting the driven means. The flywheel 13 is mounted for free rotation upon the shaft 14 and, as is usual, may be driven from any suitable source of power through a belt 15, and the shaft 14 is herein shown as a part of a crankshaft 16 adapted to actuate a pitman 17 of a punch press 18. A brake drum 19 formed integral with, or secured to, the shaft 14 is provided and is herein shown adapted to be grippingly embraced by a split brake band 21 normally urged in drum gripping position by a spring 22, see Figure 2. By means of a wedge-shaped member 23 acting between and on rollers 24 and 25 mounted on the free ends of the split brake band 21 this band may be released from the drum 19 by pressing downwardly upon a foot treadle 26 connected to the wedge member 23 by a rod 27 and a pivoted arm 28.

The clutch part 11 is connected by bolts 29 to the flywheel 13 and the clutch part 12 is connected by bolts 31 to a hub member 32 which is axially slidable on a sleeve 33 secured to the shaft 14 by a key 34. The hub member 32 and the sleeve 33 are drivingly connected by a plurality of struts 35 to be self-energizing in a manner fully described in a copending application of Clarence M. Eason, Serial No. 279,899, filed June 19, 1939. Briefly the clutch part 12 when in operative engagement with the clutch part 11 is drivingly connected to the shaft 14 through the hub member 32, the struts 35, the sleeve 33, and the key 34.

In order to actuate the clutch, constituted by the parts 11 and 12 in this instance, it is necessary to cause axially sliding movement of the part 12 relatively to the part 11, toward the right in Figure 1 to disengage the parts, and toward the left to engage them. A thrust collar 36 disposed in engagement with the outer end 37 of the hub member 32 when pressed toward the same is adapted to disengage the clutch parts 11 and 12 and springs 38 which react between the hub member 32 and the sleeve 33 are adapted to force the clutch part 12 into engagement with the clutch part 11 when pressure on the collar 36 is released.

The thrust collar 36, in the form shown in Figures 1-5 inclusive forms a member of the clutch operating mechanism of this invention. To prevent the collar 36 from rotating relatively to the hub member 32, a pin, or pins, 39, see Figures 3 and 4, is extended through the collar 36 and into the end 37 of the hub member 32. A number of shims 41 are placed between the collar 36 and the hub member end 37 for the usual adjustment of variations due to wear. A plurality of substantially semi-circular grooves 42 spaced apart peripherally of and formed in the outer face 43 of the collar 36 are provided and are inclined outwardly toward the outer face 43 and circularly about this face in a direction opposite to the direction of rotation of the collar 36, when the clutch parts 11 and 12 are in engagement.

The clutch operating mechanism of this invention, as exemplified by the form shown in Figures 1-5 inclusive, further includes a collar 44 rotatably mounted on a sleeve 45 which in turn is mounted on the shaft 14 and extends into a recess 47 provided in the face of the brake drum 19 for this purpose, at which end the sleeve 45 is enlarged in diameter to form a flange 48 which is suitably secured to the brake drum 19, or to the shaft 14. The flange 48 is provided with a groove 49 in its periphery wherein a coiled spring 51 is seated. One end of the coiled spring 51 is secured as by a pin 53, see Figure 5, to the brake drum 19 and its other end is secured as by a pin 52 to the collar 44 and is arranged and tensioned to rotatably urge the collar about the sleeve 45 and shaft 14 in the direction of rotation of the shaft 14 when the clutch parts 11 and 12 are engaged.

The collar 44 is provided with a plurality of substantially semi-circular grooves 50 which are spaced apart peripherally of and formed in the outer face 54 of this collar 44 and are inclined outwardly toward this outer face 54 and circularly about this face in the same direction as the rotative movement of the sleeve 45 and shaft 14. The grooves 50 correspond in number to the grooves 42 provided in the collar 36 and are normally disposed in axial relation thereto, the outer faces 43 and 54 of the collars 36 and 44 respectively being in opposed relation.

The arrangement of the above described elements of the clutch operating mechanism is such that when these elements are in normal unrestrained condition the coiled spring 51 is acting to hold the collar 44 with respect to the collar 36 whereby the deep ends 55 and 56 of the grooves 42 and 50 respectively are opposite one another and a ball 57 disposed therebetween and riding in each of these grooves will be seated in the deep ends 55 and 56. When the collars 36 and 44 are in such position, the clutch parts 11 and 12 are permitted to engage under influence of the springs 38. In view of the above construction and inclination of the grooves 42 and 50, should the collar 44 be restrained by interrupting its rotation with the shaft 14 and collar 36 a relatively rotative movement will take place between the collars 36 and 44, and the grooves 42 and 50 will rotate relatively to each other and the shallow ends 58 and 59 of the grooves 42 and 50 respectively will become opposite one another with the balls 57 therebetween, whereby the collar 36 will be moved axially away from the collar 44 and impose an axial thrust upon the hub member 32 and thence to the clutch part 12 to disengage it from the clutch part 11.

The means to restrain, or stop, rotation of the collar 44 as shown in Figures 1-5 inclusive, and thereby stop rotation of the shaft 14 comprises a catch arm 61 pivoted at 60 to the frame of the punch press 18 to swing into the path of a lug 62 formed on the periphery of the collar 44. The catch arm 61 is connected by an extension 64 of the rod 27 to the foot treadle 26 whereby when the brake band 21 is released thereby the arm will be swung out of the path of the lug 62. A spring pressed plunger 65 is herein shown to normally urge the arm 61 into the path of the lug 62 and through it and the rod 27 to hold the treadle up and the wedge member 23 in its inoperative position in respect to the rollers 24 and 25. Preferably the lug 62 is positioned on the collar 44 to stop the crankshaft 16 when the pitman 17 is in its uppermost position.

In the form shown in Figures 6 and 7 a collar 71 corresponding in all respects to the collar 44 is pinned as by pins 72 to a supplemental brake drum 73 which is rotatably mounted by a ball bearing upon a shaft 74 to which a brake drum 75 corresponding to the brake drum 19 is secured as by a key 76. In this form both of the drums 73 and 75 are gripped simultaneously by adjacent and connected portions of a split brake band 77 under influence of a spring 78. When the portions of the brake band 77 grip the drums 73 and 75, the drum 73, due to its small mass is stopped practically instantly by the portion of the brake band engaging it. The drum 75, being part of the comparatively massive shaft 74, which in turn is being driven by a flywheel when it is connected thereto as shown in Figure 1 by engagement of the clutch members, may continue to rotate to some extent until the clutch is fully disengaged and then is brought to rest by the portion of the brake band 77 engaging it. Such action obviates any possible shock of an abrupt braking action imposed on the relatively massive moving parts. The foot treadle 26, in this instance, is connected by the rod 27 to one end of a lever 79 pivoted at 80, the other lever end engaging an end of a lever 81, the other end of which is adapted to engage a stud 83 extending from a slide 84 upon which the brake band operating wedge member 23 is mounted. A spring 85 is provided to bias the lever 81 and treadle 26 into brake setting position. The action of the clutch operating mechanism shown in Figures 6 and 7 is similar in all respects to that of the form shown in Figures 1-5, inclusive, in that stopping of the collar 71 will cause the balls 57 to slide the collar 36 axially and impose an axial thrust on the hub member 32 to disengage the clutch parts 11 and 12.

In the form shown in Figures 8 and 9 a ball thrust bearing 91 is provided to act against the hub member 32. The ball thrust bearing 91 is disposed in an annular recess 92 of a collar 93 secured in an end recess 94 provided in a sleeve 95. A brake drum 96 surrounds the sleeve 95 and is secured against relative rotation in respect thereto by a key 97 fixed in the sleeve 95 and axially slidable in a key-way 98 formed in the drum 96. The sleeve 95 has screw threads 99 formed in its interior surface which fit corresponding screw threads 101 formed on the shaft 102. A split brake band 103 is arranged to engage the brake drum 96 under the influence of a spring 106 when a wedge member 104 lowers out of engagement with rollers 105 on the free ends of the brake band 103.

In this instance, the brake band 103 is released by forcing the wedge 104 upwardly by means of the treadle 26 through the rod 27 acting on one end of a lever 107 pivoted at 108, the other end of which lever 107 through a roller 109 engages the lower end of wedge member 104. When the brake band is released the sleeve 95 is free to rotate with the shaft 102 and no thrust is imposed on the hub member 32 but when the brake band is urged into braking engagement with the drum 96 the sleeve 95 is held stationary being keyed to the drum 96 and due to the cooperating action of the screw threads 99 and 101 on the sleeve 95 and the shaft 102 respectively a thrust is imposed on the hub member 32 and the clutch parts 11 and 12 will be disengaged, the sleeve 95 tending to move axially toward the hub member 32. A stud 111 may be provided extending from the sleeve 95 and adapted to ride in a slot 112 formed in the shaft 102 to limit the relative movement between these parts and to stop further rotation of the shaft 102 by the brake band 103 when such limit of movement is reached.

As disclosed above an improved clutch operating mechanism has been provided for use with devices such as clutches requiring axial movement for their operation. The mechanism of this invention provides means to utilize the rotative movement of a shaft, or other driven element to efficiently produce an axial movement of a thrust collar or like member by which a device requiring axial movement for its operation may be actuated. The broad combination of balls, or rollers, operating between oppositely inclined surfaces provided on opposing members to separate these members when one of them is rotated relatively to the other is shown and described in Patent Nos. 1,974,390 and 2,057,242 issued Sept. 18, 1934, and October, 1936, respectively.

While there has been shown and described herein several forms in which the features and principles of this invention may be embodied it is to be understood that the invention is not to be limited thereto but may be embodied in other forms without departing from the spirit and essential attributes thereof. It is therefore desired that the present embodiment be considered in all respects as illustrative and not restrictive, and it will be further understood that each and every novel feature and combination thereof, present in or possessed by, the device herein disclosed, forms a part of the invention included in this application.

What is claimed as new and for which it is desired to secure Letters Patent, is:

1. In combination with a clutch having a pair of rotatable elements separable by axial movement of a first one of said elements, a shaft to which said first element is drivingly connected to be rotated thereby, a collar mounted to rotate relatively to said shaft, means to connect said first clutch element to said collar and to axially move said clutch element to disengage it from the other clutch element when the rotation of said collar is interrupted, and common means including a brake band encircling said collar and said shaft to interrupt the rotation of said collar while said shaft is rotating and to subsequently interrupt the rotation of said shaft.

2. In mechanism to produce an axial movement of a part rotatable with and axially movable relatively to a rotatable shaft including a member rotatable relatively to the shaft, means between said part and said member adapted to cause axial movement of the part relatively to the shaft when the rotation of said member relatively to the shaft is interrupted, and common means including a brake band encircling said member and said shaft to interrupt the rotation of said member while the shaft is rotating and to subsequently interrupt the rotation of said shaft.

3. In mechanism to axially move a first rotatable clutch part to disengage it from a cooperating second clutch part, a shaft to which said first clutch part is connected, a member rotatable relatively to said first clutch part, and cooperating means between said member and said first clutch part, including an inclined surface on said member, and a rotatable member riding on said inclined surface and acting on said first clutch part to move it axially when the rotation of said member is interrupted and said first clutch part is rotating, means to interrupt the rotation of said member including a lug on said member, an arm swingable into the path of said lug, a brake band encircling said shaft and operable thereon to stop rotation thereof and through it the rotation of said first clutch part, means to actuate said brake band to stop rotation of said shaft, releasable means to retain said brake band actuating means inoperative, and common manually operable means to swing said arm and to release said retaining means for said brake band actuating means.

4. In mechanism to axially move a first rotatable clutch part to disengage it from a cooperating second clutch part, a member rotatable relatively to said first clutch part, and cooperating means between said member and said first clutch part operable when the rotation of said member is interrupted and the said first clutch part is rotating to axially move said first clutch part, and common brake means adapted to stop the rotation of said member and said first clutch part.

5. In mechanism to axially move a first rotatable clutch part to disengage it from a cooperating clutch part, a shaft to which said first clutch part is connected, a collar mounted for rotation relatively to said shaft, a brake drum connected to said shaft, a spring connecting said collar to said drum, means to interrupt the rotation of said collar relatively to said shaft, and cooperating means between said collar and said first clutch part to axially move said first clutch part when the rotation of said collar is interrupted.

6. In mechanism to axially move a first rotatable clutch part to disengage it from a cooperating clutch part, a shaft to which said first clutch part is connected, a collar mounted for rotation relatively to said shaft, a brake drum connected to said shaft, a spring connecting said collar to said drum, means to interrupt the rotation of said collar relatively to said shaft and to substantially immediately thereafter interrupt the rotation of said shaft, and cooperating means between said collar and said first clutch part to axially move said first clutch part when the rotation of said collar is interrupted.

7. In mechanism to axially move a first rotatable clutch part to disengage it from a cooperating clutch part, a shaft to which said first clutch part is connected, a collar mounted for rotation relatively to said shaft, a brake drum connected to said shaft, a spring connecting said collar to said drum, means to interrupt the rotation of said collar relatively to said shaft and to interrupt the rotation of said shaft including a brake band cooperating with said brake drum, an arm cooperating with a lug on said collar, and means to simultaneously actuate said brake band and said arm, and cooperating means between said collar and said first clutch part to axially move said first clutch part when the rotation of said collar is interrupted.

8. In combination with a clutch having a pair of normally engaged cooperating elements separable by axial movement of a first one, a shaft drivingly connected to the first clutch element to be rotated thereby, a brake drum secured to said shaft, a collar mounted to rotate freely about the shaft, means between said collar and said first clutch element operable when rotation of the collar is interrupted to axially move said first clutch element, means to connect the collar with the brake drum and to rotate it in the same direction as the shaft rotates to free the first clutch element from the axially moving action of said element moving means, means to interrupt the rotation of said collar, a brake band about said brake drum, means to tighten the band upon the brake drum, and means to control the action of said collar rotation interrupting means and the band tightening means to cause substantially simultaneous action thereof.

9. In combination with a clutch having a pair of normally engaged cooperating elements separable by axial movement of a first one, a shaft drivingly connected to the first clutch element to be rotated thereby, a brake drum secured to said shaft, a collar mounted to rotate freely about the shaft, means between said collar and said first clutch element operable when rotation of the collar is interrupted to axially move said first clutch element, a spring connecting the collar to the brake drum for rotation therewith, releasable means to interrupt the rotation of the collar by said brake drum, said spring being tensioned to act, when the interrupting means is released, to rotate the collar relatively to the brake drum and free the first clutch element from the action of the element axially moving means, a releasable brake band about said brake drum, and common means to release the collar rotation interrupting means and the brake band.

JAMES L. GIFFEN.
RAYMOND A. FREEMAN.